United States Patent [19]

Klaebo

[11] Patent Number: 4,538,410
[45] Date of Patent: Sep. 3, 1985

[54] COMPRESSOR DIFFUSER NON-RETURN VALVE AND METHOD FOR STARTING GAS TURBINE ENGINES

[75] Inventor: Per Klaebo, Kongsberg, Norway

[73] Assignee: A/S Kongsberg Vapenfabrikk, Norway

[21] Appl. No.: 608,369

[22] Filed: May 9, 1984

Related U.S. Application Data

[63] Continuation-in-part of Ser. No. 395,997, Jul. 7, 1982, abandoned.

[51] Int. Cl.$^3$ ............................................. F02C 7/268
[52] U.S. Cl. .................................. 60/39.02; 60/39.142
[58] Field of Search .................... 60/39.02, 39.142; 415/148, 157, 158, 126, 146

[56] References Cited

U.S. PATENT DOCUMENTS

| | | | |
|---|---|---|---|
| 2,814,431 | 11/1957 | Darrow et al. | 415/158 |
| 2,818,704 | 1/1958 | Karcher | 60/39.141 |
| 2,941,790 | 6/1960 | Compton et al. | 60/39.142 |
| 3,289,919 | 12/1966 | Wood | 415/158 |
| 3,478,955 | 11/1969 | Kunderman | 415/158 |
| 4,092,824 | 6/1978 | Friedrich | 60/39.142 |
| 4,141,506 | 2/1979 | Cuthbert et al. | 239/456 |

FOREIGN PATENT DOCUMENTS

| | | | |
|---|---|---|---|
| 2642347 | 4/1977 | Fed. Rep. of Germany | 60/39.142 |
| 1001309 | 2/1952 | France . | |

*Primary Examiner*—Louis J. Casaregola
*Attorney, Agent, or Firm*—Finnegan, Henderson, Farabow, Garrett & Dunner

[57] ABSTRACT

Gas turbine engine starting method and apparatus includes the engine turbine and rotary compressor components coupled for dependent rotation; a compressor plate diffuser with an integral, floating plate one-way valve; a housing receiving diffused compressed air for channeling to the combustor; and a source of pressurized air connected for admission to the housing during startup at a point upstream of combustor and downstream of one-way valve for initiating rotation of the turbine and coupled compressor.

16 Claims, 6 Drawing Figures

COMPRESSOR DIFFUSER NON-RETURN VALVE AND METHOD FOR STARTING GAS TURBINE ENGINES

BACKGROUND OF THE INVENTION

This application is a continuation-in-part of application Ser. No. 395,997 filed July 7, 1982 (abandoned).

1. Field of the Invention

The compressor diffuser non-return valve apparatus and method for starting a gas turbine engine relates in general to gas turbine engine starting systems.

2. Description of the Prior Art

Conventional gas turbine engines starting systems require the use of an auxiliary motor with associated gearing and clutch mechanisms to start the engine. Typically, the auxiliary motor is made to turn a rotary compressor component of the gas turbine engine to initiate the flow of compressed air through the combustor and then through the turbine component in order to initiate rotation of the latter element. Once the necessary speed of rotation in the turbine component is established, fuel is introduced into the combustor and normal operation of the gas turbine engine is established. The necessity for a separate auxiliary starting motor, together with ancillary clutch and mechanical drive systems, increases the bulk, weight and cost of the overall engine, and contributes to the probability for failure of a component and the resultant need for expensive maintenance.

SUMMARY OF THE INVENTION

The present invention utilizes the turbine component of a gas turbine engine with a rotary compressor component coupled to the turbine for dependent rotation therewith, in place of the auxiliary motor conventionally used during the startup mode. Because the weight, bulk and complications attendant to the use of an auxiliary startup motor are eliminated by the present invention, cost savings can be achieved, and the overall system can be significantly simplified, leading to a higher reliability. By using a larger part of the turbine working capacity, a very rapid start and acceleration can be achieved which would not be practical using a conventional starting system. Moreover, the reduction in engine weight and bulk can be expected to result in a corresponding and important weight reduction for certain applications such as vehicle propulsion power plants.

In accordance with the purpose of the invention as embodied and broadly described herein, the apparatus for starting a gas turbine engine of the type having a rotary compressor for compressing air, a combustor for combusting the compressed air with fuel to produce combustion gases under pressure, and a turbine for expanding the combustion gases to produce mechanical work, the turbine and the compressor being coupled for dependent rotation, comprises diffuser means operatively connected to the rotary compressor to receive and convert the high velocity air to low velocity, higher pressure air; means operatively connected to the diffuser means for receiving and collecting the low velocity, higher pressure compressed air and channeling the higher pressure air to the combustor, the collecting means including a housing, a high pressure gas flow path being defined through the diffuser means and the housing, and to the combustor; means for supplying pressurized gas to the housing at a point upstream of the combustor and downstream of the diffuser means in a flow path during engine startup; and valve means integral with the diffuser means for preventing reverse flow of the pressurized gas through the combustor and being expanded in the turbine to cause rotation of the turbine and the compressor and to establish a flow of pressurized air to the combustor.

Preferably, the diffuser means includes a plate-type radial diffuser and the housing means receives higher pressure air from the plate diffuser, and the valve means is associated with the plate diffuser, and wherein said plate diffuser includes a circular nozzle portion having an inner edge defining an axially directed plate diffuser inlet, and a radially directed flared outer edge, a planar member oriented perpendicular to the plate diffuser inlet axis and spaced from the nozzle, a plate member positioned between the nozzle and the planar member, the radially outer portion of the plate member together with the spaced adjacent outer nozzle edge forming a radially directed annular plate diffuser exit when the plate member abuts the planar member, and plate securing means for providing unrestricted axial movement of the plate member between a sealing position against the planar member and an unsealing position against the nozzle, the introduction of said pressurized gas during startup causing a net pressure force on the plate to move said plate member to the sealing position, and the impact force of high velocity air from the compressor during subsequent normal operation causing movement of the plate member to the unsealing position.

It is further preferred that the apparatus include means for bleeding the pressurized gas to the back surface of the plate member facing the planar member during startup, the bleeding means bypassing the portion of the flow path through the plate diffuser exit, and that the pressurized gas is pressurized air.

Further in accordance with the purpose of the present inventions as broadly described herein, the method for starting a gas turbine engine having a rotary compressor and diffuser for providing high pressure air, a combustor for combusting fuel with the compressed air to produce combustion gases, and a turbine for expanding the combustion gases to produce mechanical work, the turbine and the compressor being mechanically coupled for dependent rotation, comprises the steps of introducing pressurized gas into the compressed air flow path between the diffuser and the combustor; preventing back flow of pressurized gas through the diffuser and compressor using one way valve means associated with the diffuser; expanding the pressurized gas through the turbine to cause rotation of the turbine and the compressor; and returning the one way valve to normal open position under the influence of the flow of compressed air from the rotating compressor.

Preferably, the pressurized gas is air, and the method includes the further step of combusting fuel with the pressurized air to increase gas energy prior to the expanding step.

It is further preferred that the non-return valve include means for decreasing the total force applied to the plate member by the pressurized gas, the force decreasing means further including the plate member having a planar area significantly less than the area circumscribed by the nozzle outer edge, and a recess formed in the planar member for receiving the plate member when the plate member is in the unsealing position.

The accompanying drawing which is incorporated in, and constitutes a part of the specification, illustrates one embodiment of the invention and, together with the description, serves to explain the principles of the invention.

Reference will now be made in detail to the present preferred embodiment of the invention, an example of which is illustrated in the accompanying drawing.

DESCRIPTION OF THE PREFERRED EMBODIMENT

Figure 1:
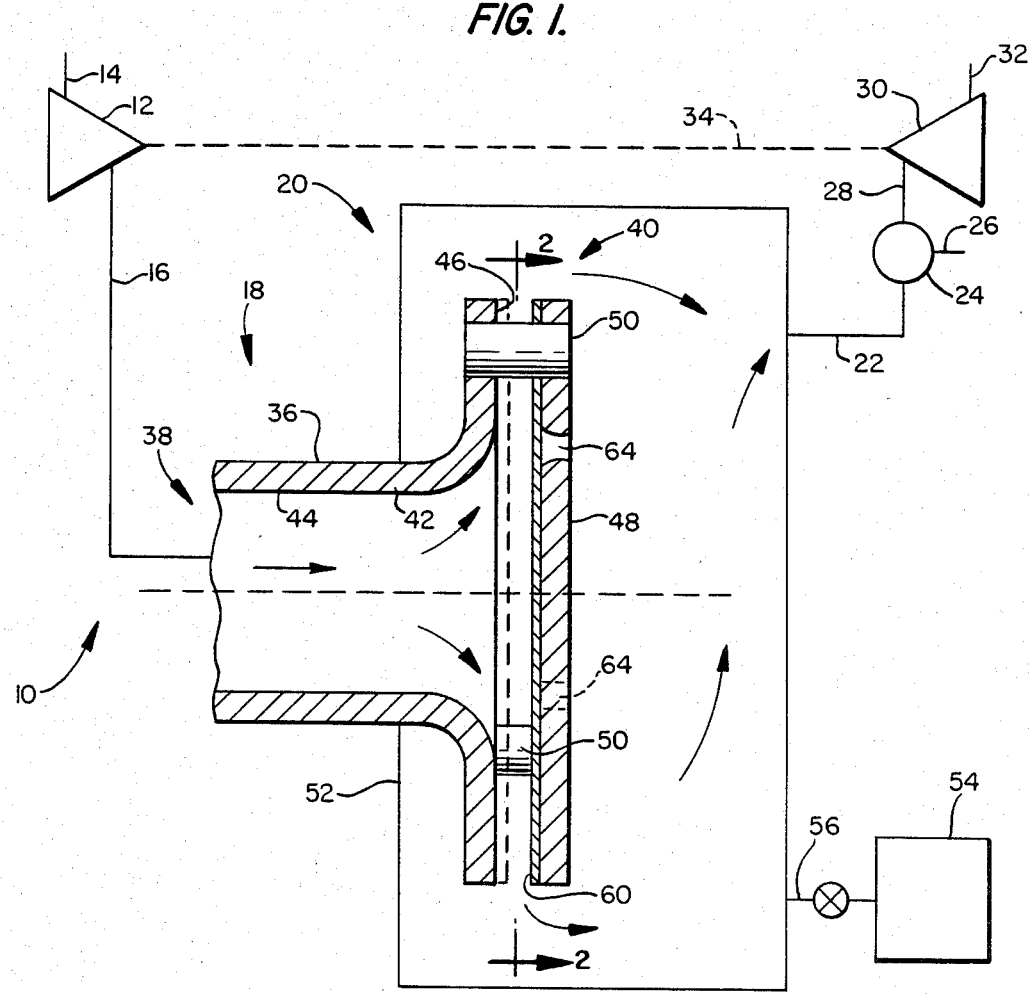
FIG. 1 is a schematic cross-sectional view of a plate diffuser showing the non-return valve of the present invention being utilized in a gas turbine engine.

With reference to FIG. 1 of the drawing, there is shown schematically a gas turbine engine embodying the present invention, the engine being designated generally by the reference numeral 10. Engine 10 includes a rotary compressor 12 having an inlet 14 for the air to be compressed and an outlet 16 for the compressed air, which is typically delivered at a relatively high velocity. Engine 10 further includes a means for diffusing the high velocity air to convert the kinetic energy of the high velocity gas into increased gas pressure, the diffusing means being generally designated by reference numeral 18. Engine 10 further includes means for collecting the diffused air from diffusing means 18 and channeling it to the remainder of the engine for utilization; the collecting means denoted generally by the reference numeral 20. Specific components for achieving the diffusing and collecting functions as they relate to the present invention will be discussed hereinafter.

With continued reference to FIG. 1, the high pressure air flows via ducting 22 to combustor 24 where it is mixed with fuel from fuel source 26 and combusted to yield high pressure combustion gases. These combustion gases are, in turn, channeled via ducting 28 to turbine 30 where they are expanded to produce rotary mechanical power. Expanded combustion gases exiting turbine 30 via turbine outlet 32 are then either discharged to the atmosphere or processed further to recover heat values such as in a recuperated gas turbine cycle. One of ordinary skill in the art in designing gas turbine systems would readily understand the foregoing and be able to adapt the present invention to a recuperated gas turbine engine application.

It is understood that the above-described components of engine 10, except for the components constituting the diffusing and collecting means, could be readily selected from any conventional apparatus by one of ordinary skill in the art. For instance, rotary compressor 10 can be a pure radial or pure axial rotary compressor or a mixed axial-radial machine. Similarly, the rotation of compressor 10 can be directly or indirectly connected to turbine 30. Such a connection is depicted schematically by broken line 34 between compressor 10 and turbine 30 in FIG. 1.

In accordance with the present invention there is provided diffuser means operatively connected to the rotary compressor to receive and convert the high velocity air to relatively low velocity, higher pressure air. As embodied herein and as shown in FIG. 1, diffuser means 18 includes a plate-type radial diffuser 36 which receives high velocity gas through an axial inlet portion 38 of circular cross-section and delivers high pressure, low velocity gas through a radial annular outlet portion 40. In the embodiment shown in FIG. 1, plate diffuser 36 includes nozzle part 42 having an inner edge 44 defining a circular axial inlet and a flared outer edge 46 defining in part the radial exit 40.

Figure 2:
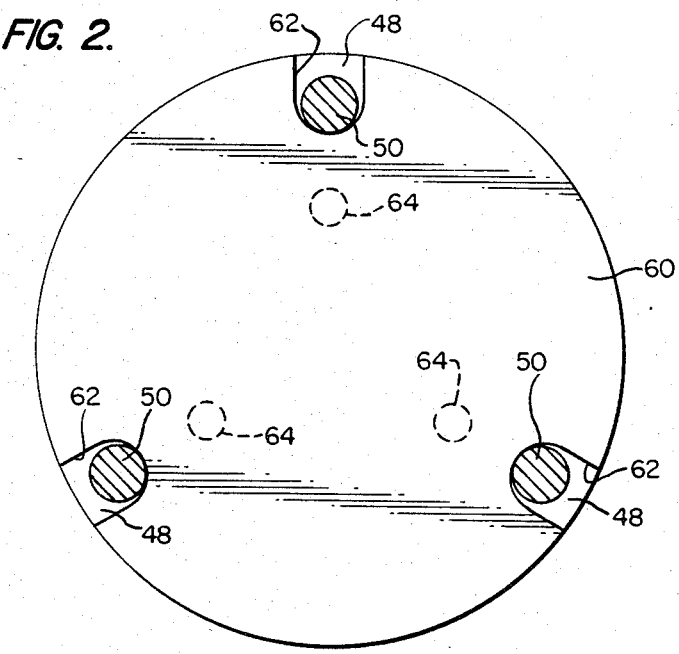
FIG. 2 is a sectional view taken of a portion of the apparatus shown in FIG. 1, at the location 2—2.

Plate diffuser 36 further includes planar wall member 48 positioned parallel to, and spaced from, nozzle edge 46 by a plurality of spacer studs 50. Three equally spaced spacer studs are shown in FIG. 2 positioned around the circumference of the flared edge 46. Precise dimensions of plate diffuser 36 will depend on the flow capacity of the compressor 12 and one of ordinary skill in the art would be able to make the necessary calculations. Also, more than a single plate diffuser unit may be utilized, and the multiple units may be arranged symmetrically about the periphery of compressor 12.

Further in accordance with the present invention, means are provided for receiving and collecting the diffused air from the plate diffuser 36. As embodied herein, collecting means 20 includes a housing 52 completely surrounding exit 40 of plate diffuser 36 and operatively connected to channel the diffused air to ducting 22 for flow to combustor 24. A flow path is thus defined for the compressed air during normal operation of the gas turbine engine 10, namely through plate diffuser 36 and housing 52 to ducting 22, and this path is shown by the arrows in FIG. 1. The precise shape of housing 52 will depend in general on the shape and orientation of the other components of the engine 10 and on the relative location of ducting 22, as well as on the actual number of individual diffuser units.

Still further in accordance with the present invention, there is provided means for supplying pressurized gas during engine startup to the compressed air flow path downstream of the diffuser means 18 and upstream of the combustor 24. As embodied herein, high pressure gas source depicted schematically as 54 is connected to housing 52 via valved conduit 56. Upon activation of the valved conduit 56 during startup, the pressurized gas can be admitted to the flow path at a point downstream of plate diffuser 36 and upstream of combustor 24. Upon admission, the pressurized gas flows through the combustor 24 to the turbine 30, thereby causing rotation of that component together with compressor 12 coupled for dependent rotation. The rotation of the turbine 30 and compressor 12 components results in the initiation of the flow of pressurized air through engine 10, which air can be mixed with fuel in combustor 24 and the engine 10 started and brought to normal operating conditions.

Preferably, the compressed gas admitted from gas source 54 is compressed air which can be combusted with fuel in combustor 24 to increase the enthalpy and thus the energy deliverable to turbine 30 during startup. However, the present invention is intended to utilize any suitable source of pressurized gas, including a non-oxidizing gas, such as can be delivered from solid fuel gas generator units, and the present invention is not intended to be limited by the particular type of pressurized gas source 54.

Still further in accordance with the present invention, there is provided valve means integral with the diffuser means for preventing reverse flow of the pressurized gas through the compressor through startup. As embodied herein, valve means includes plate member 60 positioned between flared edge 46 and planar wall member 48 of plate diffuser 36. As can be appreciated from FIG. 1, plate member 60 when positioned against wall member 48 provides essentially unrestricted flow through the plate diffuser 36 along the normal flow path, while when positioned against edge 46 (shown in FIG. 1 by the dotted lines) plate member 48 effectively seals off plate diffuser 36 from reverse flow. As can be best seen in FIG. 2, plate member 60 is provided with relief notches 62 corresponding to the location of spacer studs 52 and of a size to permit unrestricted sliding clearance. Plate member 60 thus is constrained for essentially unrestricted axial movement between edge 46 and wall member 48.

During startup operation, valve conduit 56 is activated to allow a quantity of pressurized gas from gas source 54 to be admitted to housing 52. The charge of pressurized gas initially begins to flow into plate diffuser exit 40, as well as through ducting 22. The momentary back flow of pressurized gas through plate diffuser 36 creates a decrease in pressure on the face of plate member 60 adjacent the flared edge 46 relative to the other face of plate member 60, as a consequence of the Bernoulli effect. The net pressure force on plate member 60 is then such to translate it axially into the sealing position where thereafter it is held by the static force of the pressurized gas. After turbine 30 and compressor 10 have started rotation, the flow of compressed air from compressor 10 into the plate diffuser inlet 38 will impact against plate member 60 and translate it axially in the opposite direction against wall member 48 where it will be held during normal operation of engine by the impact force of the turning compressed air stream.

Preferably, wall member 48 is provided with a plurality of through-holes 64 (three are shown in FIG. 2) to allow the pressurized gas access to the back surface of plate member 60, that is, the surface opposite the flared edge 46. Holes 64 serve to decrease the time for plate member 60 to respond to the introduction of pressurized gas from source 54 during startup and consequently to minimize the loss of pressurized gas back through the compressor 12. During a normal operation, the position of holes 64 is such that plate member 60 acts to seal off holes 64 and force the turning compressed air to exit plate diffuser 36 through the normal exit 40.

Under some operating conditions, the force resulting from the pressurized gas pressure in housing 52 acting over the entire surface of plate member 60 may approach and even exceed the force resulting from the pressure of the compressed gas in diffuser inlet portion 38 acting on the opposite side of plate member 60. In such cases, the attainment of steady-state operation during startup and following initiation of rotation of compressor 12 may be delayed or even prevented. However, the alternate embodiments of the present invention depicted in FIGS. 3A, 3B and 4A, 4B are intended to circumvent this potential problem, and reference will now be made to these figures.

Further in accordance with the present invention, the apparatus for starting a gas turbine engine as described above also includes means for decreasing the total force applied to the plate member by the pressurized gas, the force decreasing means including the plate member having a planar area significantly less than the area circumscribed by the nozzle outer edge, and also a recess formed in the planar member for receiving plate member when the plate member is in the unsealing position. As embodied herein, and with specific reference to FIGS. 3A, 3B, the compressor non-return valve means includes plate diffuser 136 with the nozzle portion 142 having an inner edge 144 defining a circular axial diffuser inlet, and a flared outer edge 146 having generally a square geometric shape for defining, in part, the diffuser radial exit 140. Plate diffuser 136 also includes square planar wall member 148 positioned parallel to and spaced from nozzle edge 146 by a plurality of spacer studs 150 positioned at the corners.

In the FIG. 3 embodiment, the valve means includes plate member 170 having a generally circular configuration with a planar area significantly less than that of planar wall member 148 and also having post extension 172 fixedly connected to the center of plate member 170 and oriented perpendicular thereto. Further, planar wall member 148 includes through-hole 174 positioned along nozzle center line 176 for slidably receiving post 172 to guide plate member 170 in translation movement between the unsealing position and the sealing position (depicted in FIG. 3 by broken lines), due to pressurized gas being admitted to interior 153 of diffuser containment housing 152. Plate member 170 preferably has a circumferential size just sufficient to block the nozzle axial inlet, as the sealing force is a product of the gas pressure in space 153 times the planar area of plate member 170 which consequently should be as small as reasonably possible. Post 172 should have a sufficient length to permit guiding engagement with hole 174 during translation between a sealing and unsealing position. Planar wall member 148 also can include a boss portion 148a (shown by broken lines), on the surface distant plate 170, to provide additional guiding support for post 172.

As also embodied herein, wall member 148 includes circular recess 178 for receiving plate member 170 in the unsealing position. The depth of recess 178 should be equal to or slightly less than the thickness of plate member 170 to provide, at the worst, a "downward" step for the gas from compressor 12 impinging on plate member 170 and flowing toward exit 140. An "upward" step is to be avoided and no step (recess depth equal to plate thickness) is preferred. The circumference of recess 178 can be made slightly larger than the circumference of plate member 170 and the edge 170a of plate member 170 beveled to insure proper seating in the unsealing position. Also, a plurality of vent holes 164 can be provided in wall member 148 in the vicinity of recess 178 to provide bleeding of the compressed gas in space 153 to the rear of plate member 170 to facilitate movement to the sealing position.

Figure 3A:
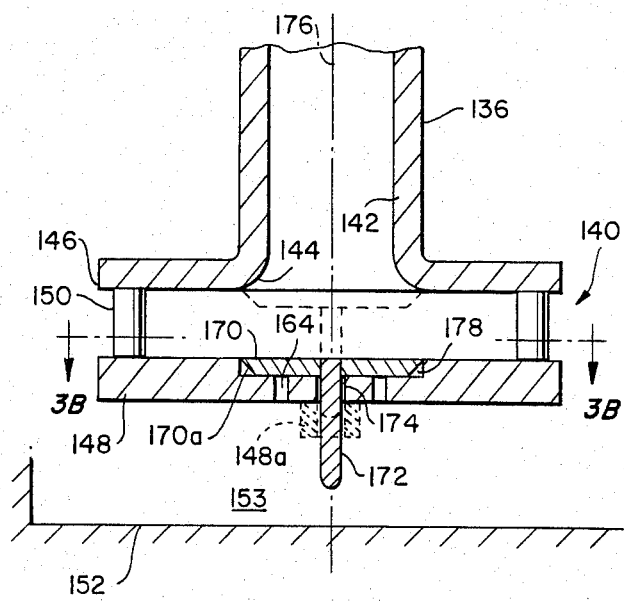
FIG. 3A is a schematic cross-sectional view of another embodiment of a non-return valve made in accordance with the present invention.
Figure 4A:
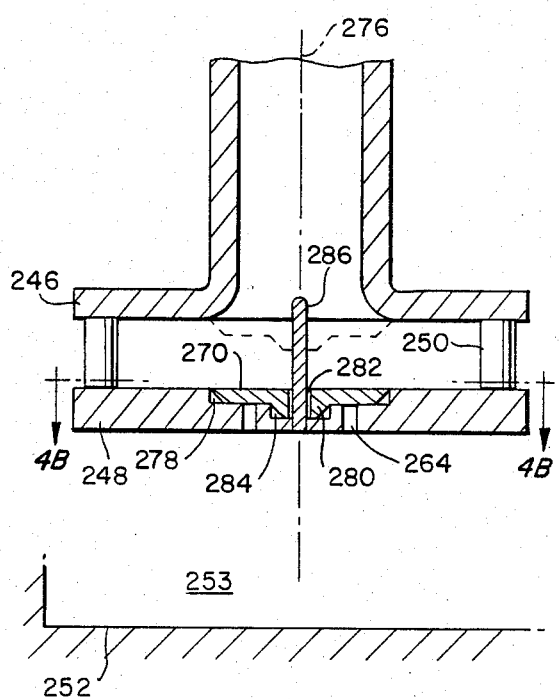
FIG. 4A is a schematic cross-sectional view of a variation of the embodiment shown in FIGS. 3A, 3B.
Figure 3B:
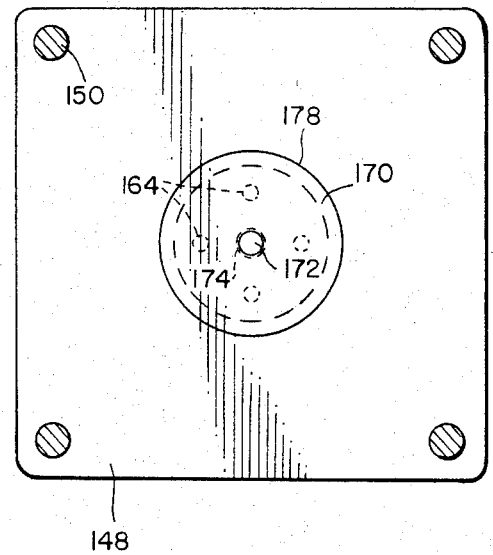
FIG. 3B is a sectional view taken of the portion of the apparatus shown in FIG. 3A, at the location 3B—3B.
Figure 4B:
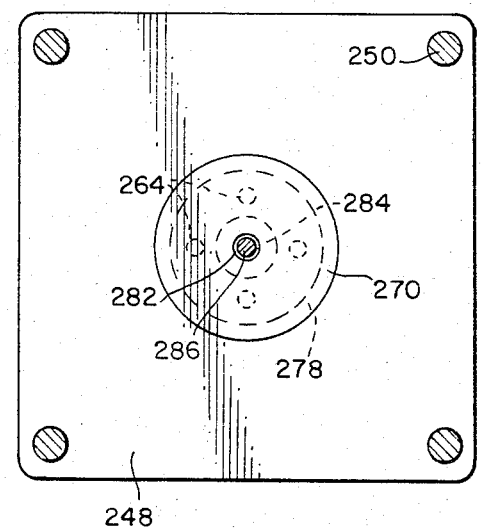
FIG. 4B is a sectional view taken at 4B—4B in FIG. 4A.

An alternative to the embodiment of FIGS. 3A, 3B is shown in FIGS. 4A, 4B. In the latter embodiment, circular plate member 270 is shown having a reduced area relative to nozzle outer edge 246 and includes a central boss portion 280 integrally formed on the side of plate member 270 opposite the nozzle inlet and hole 282 formed through the center of plate member 270 and boss 280. Planar wall member 248 includes fixedly attached post member 286 extending perpendicular to wall member 248 and in the direction towards the nozzle inlet on nozzle center line 276 and sized for sliding and guiding engagement with hole 282. Planar wall member 248 also includes a pair of recesses 278 and 284 for receiving plate member 270 and boss 280, respectively, when in the unsealing position. A plurality of vent holes 264 are provided in wall member 248 in the vicinity of recess 278 to provide a bleed path for compressed gas in interior 253 of diffuser housing 252 to the rear of plate member 270 for the reasons explained previously.

It will be apparent to those skilled in the art that various modifications and variations could be made in the compressor-pipe diffuser non-return valve for use in gas turbine engine starting systems of the present invention without departing from the scope or spirit of the invention.

What is claimed is:

1. Apparatus for starting a gas turbine engine of the type having a rotary compressor for compressing air, a combustor for combusting the compressed air with fuel to produce combustion gases under pressure, and a turbine for expanding the combustion gases to produce mechanical work, the turbine and the compressor being coupled for dependent rotation, the apparatus comprising:
   (a) diffuser means operatively connected to the rotary compressor to receive and convert the high velocity air to low velocity, higher pressure air;
   (b) means operatively connected to said diffuser means for receiving and collecting the low velocity, higher pressure compressed air and channeling said higher pressure air to said combustor, said collecting means including a housing, a high pressure gas flow path being defined through said diffuser means and said housing, and to the combustor;
   (c) means for supplying pressurized gas to said housing at a point upstream of the combustor and downstream of said diffuser means in said flow path during engine startup; and
   (d) valve means integral with said diffuser means for preventing reverse flow of said pressurized gas through the compressor, the pressurized gas flowing through the combustor and being expanded in the turbine to cause rotation of the turbine and the compressor and to establish a flow of pressurized air to the combustor,
   wherein said diffuser means includes a plate-type radial diffuser and said housing means receives higher pressure air from said plate diffuser, and wherein said valve means is associated with said plate diffuser, and wherein said plate diffuser includes
   (i) a nozzle portion having an inner edge defining an axially directed plate diffuser inlet, and a radially directed flared outer edge,
   (ii) a planar member oriented perpendicular to said plate diffuser inlet axis and spaced from said nozzle,
   (iii) a plate member positioned between said nozzle and said planar member, the radially outer portion of said plate member together with the spaced adjacent outer nozzle edge forming a radially directed plate diffuser exit when said plate member abuts said planar member, and
   (iv) plate securing means for providing unrestricted axial movement of said plate member between an unsealing position against said planar member and a sealing position against said nozzle, the introduction of said pressurized gas during startup causing a net pressure force on said plate to move said plate member to said sealing position, and the impact force of high velocity air from the compressor during subsequent normal operation causing movement of said plate member to said unsealing position.

2. Apparatus as in claim 1 wherein said pressurized gas is air for combustion with fuel in the combustor to further increase gas energy during the engine startup.

3. Apparatus as in claim 1 wherein said plate securing means includes a plurality of spacer studs connecting said nozzle and said planar member and corresponding number of relief notches in said plate member, said plate member being captured by said studs.

4. Apparatus as in claim 1 further including means for bleeding said pressurized gas to the back surface of said plate member facing said planar member during startup, said bleeding means bypassing the portion of the flow path through the plate diffuser exit.

5. Apparatus as in claim 4 wherein said bleeding means includes a plurality of vent holes through said planar member, flow through said vent holes being obstructed by said plate member when in said unsealing position during normal operation.

6. Apparatus as in claim 1 further including means for decreasing the time for said plate member to translate to said sealing position after the introduction of said pressurized gas.

7. Method for starting a gas turbine engine having a rotary compressor and diffuser for providing high pressure air, a combustor for combusting fuel with the compressed air to produce combustion gases, and a turbine for expanding the combustion gases to produce mechanical work, the turbine and the compressor being mechanically coupled for dependent rotation, the method comprising
   (a) introducing pressurized gas into the compressed air flow path between the diffuser and the combustor;
   (b) preventing back flow of pressurized gas through the diffuser and compressor using one way valve means associated with the diffuser;
   (c) expanding the pressurized gas through the turbine to cause rotation of the turbine and the compressor; and
   (d) returning the one way valve to normal open position under the influence of the flow of compressed air from the rotating compressor,
   wherein the diffuser includes a plate type diffuser stage and the valve means includes an axially floating plate member mounted in the plate diffuser, and wherein said preventing step includes the step of translating said plate member into a sealing position under the force of the pressurized gas.

8. Method as in claim 7 wherein the pressurized gas is air and the method includes the further step of combusting fuel with the pressurized air to increase gas energy prior to the expanding step.

9. Method as in claim 7 wherein said translation step includes the substep of preferentially bleeding pressurized gas to the back-side of the plate member to initiate movement toward the sealing position.

10. Apparatus for starting a gas turbine engine of the type having a rotary compressor for compressing air, a combustor for combusting the compressed air with fuel to produce combustion gases under pressure, and a turbine for expanding the combustion gases to produce mechanical work, the turbine and the compressor being coupled for dependent rotation, the apparatus comprising (a) diffuser means operatively connected to the rotary compressor to receive and convert the high velocity air to low velocity, higher pressure air;

(b) means operatively connected to said diffuser means for receiving and collecting the low velocity, higher pressure compressed air and channeling said higher pressure air to said combustor, said collecting means including a housing, a high pressure gas flow path being defined through said diffuser means and said housing, and to the combustor;

(c) means for supplying pressurized gas to said housing at a point upstream of the combustor and downstream of said diffuser means in said flow path during engine startup; and (d) valve means integral with said diffuser means for preventing reverse flow of said pressurized gas through the compressor, the pressurized gas flowing through the combustor and being expanded in the turbine to cause rotation of the turbine and the compressor and to establish a flow of pressurized air to the combustor, wherein said diffuser means includes a plate-type radial diffuser and said housing means receives higher pressure air from said plate diffuser, and wherein said valve means is associated with said plate diffuser, and wherein said plate diffuser includes (i) a nozzle portion having an inner edge defining an axially directed plate diffuser inlet, and a radially directed flared outer edge, (ii) a planar member oriented perpendicular to said plate diffuser inlet axis and spaced from said nozzle, (iii) a plate member positioned between said nozzle and said planar member, the radially outer portion of said plate member together with the spaced adjacent outer nozzle edge forming a radially directed plate diffuser exit when said plate member abuts said planar member, (iv) plate securing means for providing unrestricted axial movement of said plate member between an unsealing position against said planar member and a sealing position against said nozzle, the introduction of said pressurized gas during startup causing a net pressure force on said plate to move said plate member to said sealing position, and the impact force of high velocity air from the compressor during subsequent normal operation causing movement of said plate member to said unsealing position; and (e) means for decreasing the total force applied to said plate member by said pressurized gas, said force decreasing means including (i) said plate member having a planar area significantly less than the area circumscribed by said nozzle outer edge, and (ii) a recess formed in said planar member for receiving said plate member when said plate member is in the unsealing position.

11. Apparatus as in claim 10 wherein the depth of said recess is less than or equal to the thickness of said plate member.

12. Apparatus as in claim 10 wherein said plate member has a shape corresponding generally to the shape of said diffuser nozzle inlet and planar dimensions larger than the corresponding dimensions of said nozzle inner edge only by an amount sufficient to provide sealing of said diffuser inlet.

13. Apparatus as in claim 10 further comprising means for bleeding said pressurized gas to the back surface of said plate member facing said planar member during startup, said bleeding means bypassing the portion of the flow path through the plate diffuser exit, and, said bleeding means including at least one vent hole located in said planar member to flow-connect said recess with said housing.

14. Apparatus as in claim 10 wherein said plate securing means includes an aperture in said planar member on the diffuser nozzle inlet axis, and further includes a post member fixedly attached to the side of said plate member opposite the diffuser nozzle inlet for sliding axial movement through said aperture, said post and aperture cooperating to guide said plate member for translation movement.

15. Apparatus as in claim 10 wherein said planar member includes a post member fixedly attached thereto and positioned on the axis of said diffuser nozzle inlet and extending toward said nozzle inlet, and wherein said plate member includes an aperture for axial sliding engagement with said post, said post and aperture cooperating to guide said plate member for translation movement.

16. Apparatus as in claim 15 wherein said plate member includes a built-up boss portion surrounding said aperture on the side of said plate member opposite said inlet for aligning said plate member, and wherein said planar member includes a second recess sized for receiving said boss portion.

* * * * *